(12) United States Patent
Hogstrom et al.

(10) Patent No.: US 9,471,246 B2
(45) Date of Patent: Oct. 18, 2016

(54) DATA SHARING USING DIFFERENCE-ON-WRITE

(71) Applicant: International Business Machines Corporation, Armonk, NY (US)

(72) Inventors: Matt R. Hogstrom, Cary, NC (US); Tiia Salo, Cary, NC (US); Nikola Vouk, Cary, NC (US); Meeta Yadav, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 549 days.

(21) Appl. No.: 13/860,650

(22) Filed: Apr. 11, 2013

(65) Prior Publication Data

US 2013/0232311 A1 Sep. 5, 2013

Related U.S. Application Data

(63) Continuation of application No. 13/346,412, filed on Jan. 9, 2012.

(51) Int. Cl.
*G06F 3/06* (2006.01)
*G06F 12/10* (2016.01)

(52) U.S. Cl.
CPC ............... *G06F 3/065* (2013.01); *G06F 12/10* (2013.01); *G06F 12/109* (2013.01); *G06F 2212/401* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 7,447,854 B1 | 11/2008 | Cannon | |
| 8,332,594 B2 * | 12/2012 | Borntraeger | G06F 12/109 711/147 |
| 8,499,114 B1 * | 7/2013 | Vincent | G06F 9/5077 711/147 |
| 8,909,845 B1 * | 12/2014 | Sobel | G06F 9/45558 711/154 |
| 2008/0263299 A1 * | 10/2008 | Suzuki | G06F 11/1662 711/162 |
| 2010/0030998 A1 | 2/2010 | Kiriansky | |
| 2010/0169401 A1 * | 7/2010 | Gopal | G06F 7/02 708/316 |
| 2010/0281208 A1 * | 11/2010 | Yang | G06F 3/0611 711/103 |

FOREIGN PATENT DOCUMENTS

| | | |
|---|---|---|
| CN | 102185889 A | 9/2011 |
| EP | 1956482 A1 | 8/2008 |

OTHER PUBLICATIONS

Live Gang Migration of Virtual Machines, Umesh Deshpande, HPDC'11, Jun. 8-11, 2011.*
Taper: Tiered Approach for Eliminating Redundancy in Replica Synchronization, Jain et al., Fast '05: 4th USENIX Conference on File and Storage Technologies, pp. 281-294, 2005.

* cited by examiner

*Primary Examiner* — Yong Choe
*Assistant Examiner* — Mohamed Gebril
(74) *Attorney, Agent, or Firm* — Brian J. Teague

(57) ABSTRACT

When a virtual machine writes to a page that is being shared across VMs, a share value is calculated to determine how different the page would be if the write command were implemented. If the share value is below a predefined threshold (meaning that the page would not be "too different"), then the page is not copied (as it would be in a standard copy-on-write operation). Instead, the difference between the contents of the pages is stored as a self-contained delta. The physical to machine memory map is updated to point to the delta, and the delta contains a pointer to the original page. When the VM needs to access the page that was stored as a delta, the delta and the page are then fetched from memory and the page is reconstructed.

6 Claims, 7 Drawing Sheets

DATA SHARING USING DIFFERENCE-ON-WRITE

CROSS-REFERENCE TO RELATED APPLICATIONS

This application is a continuation of and claims priority to U.S. patent application Ser. No. 13/346,412, filed Jan. 9, 2012, the contents of which is incorporated herein by reference in its entirety.

BACKGROUND

The present invention relates to data processing, and more particularly to systems, methods, and computer program products for sharing data. Virtualization technology has matured significantly over the past decade and has become pervasive within the service industry, especially for server consolidation. Research and commercial industry is now focused on optimizing the virtual environment to enable more virtual machines (VMs) to be packed on a single server, to lower power consumed in the data center environment, to lower cost of the virtualized solution, and to efficiently use the available computing resources. A significant limiting factor in accommodating more VMs on a server is memory, as the operating systems (OS) and applications are becoming more resource intensive and require significant physical memory to avoid frequent paging.

Known techniques for more efficiently using memory include (1) content-based page sharing and (2) difference engines. Content-based page sharing shares identical pages across VMs, thereby reducing the amount of physical memory required. A difference engine shares identical as well as similar pages (most of the content is identical but some content is different) and also reduces the amount of physical memory required. The difference engine technique significantly reduces the amount of physical memory required compared to content-based sharing, but is computationally very expensive as it implements a Not Recently Used (NRU) policy and requires the entire memory to be scanned periodically.

Both techniques implement the copy-on-write technique to avoid the pages from being corrupted. When a write command is received to modify a shared page, the copy-on-write technique causes the shared page to be copied and the write command is implemented on the copy. The copy-on-write technique thereby prevents the shared page from being corrupted, but any memory reduction is reversed as soon as a write command is received because the shared page must be copied.

BRIEF SUMMARY

In one embodiment of the invention, a computer-implemented method for sharing data comprises receiving, by a computer, a write command to modify shared data; determining, by the computer, an amount of shared content between (i) the shared data and (ii) the shared data if the write command were implemented; comparing, by the computer, the determined amount of shared content to a predefined threshold; if the determined amount of shared content is above the predefined threshold, creating and storing, by the computer, a delta that describes a difference between (i) the shared data and (ii) the shared data if the write command were implemented; and if the determined amount of shared content is not above the predefined threshold, creating a copy of the shared data, modifying the copy of the shared data as indicated by the write command, and storing the modified copy of the shared data by the computer.

In addition to the method for sharing data, as described above, other aspects of the present invention are directed to corresponding systems and computer program products for sharing data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the invention may provide the ability to improve on current memory sharing techniques. While embodiments of the invention are described herein in relation to virtual machines, it should be appreciated that embodiments of the invention may be used in any computing environment in which data sharing is desirable.

In content-based sharing, when a VM writes to a page a copy of that page is created. These pages are not identical any more, but in most cases have significant similar content. If this similar content can be shared the memory savings may be significant. In embodiments of the invention, when a VM writes to a page that is being shared across VMs, a share value is calculated to determine how different the page would be if the write command were implemented. If the share value is below a predefined threshold (meaning that the page would not be "too different"), then the page is not copied (in contrast a standard copy-on-write operation). Instead, the difference between the contents of the pages is stored as a self-contained delta. The physical to machine memory map is updated to point to the delta, and the delta contains a pointer to the original page. This process may be termed difference-on-write. When the VM needs to access the page that was stored as a delta, the virtual memory points to the machine memory location where the delta is stored, and the delta in turn points to the page being shared. The delta and the original page are then fetched from memory and the page is reconstructed.

Virtual memory is frequently implemented using paging. As such, embodiments of the invention will be described herein in relation to sharing pages of data. However, embodiments of the invention may be used on data that is organized/stored/referenced using techniques other than paging. In paging, a range of consecutive addresses in a virtual address space (the range of addresses used by the processor) is mapped to a corresponding range of physical addresses of the storage medium. The memory referenced by such a range is called a page. The page size is typically in the range of 512 to 8192 bytes with a few (e.g., 4) kilobytes being a common choice.

Figure 1:
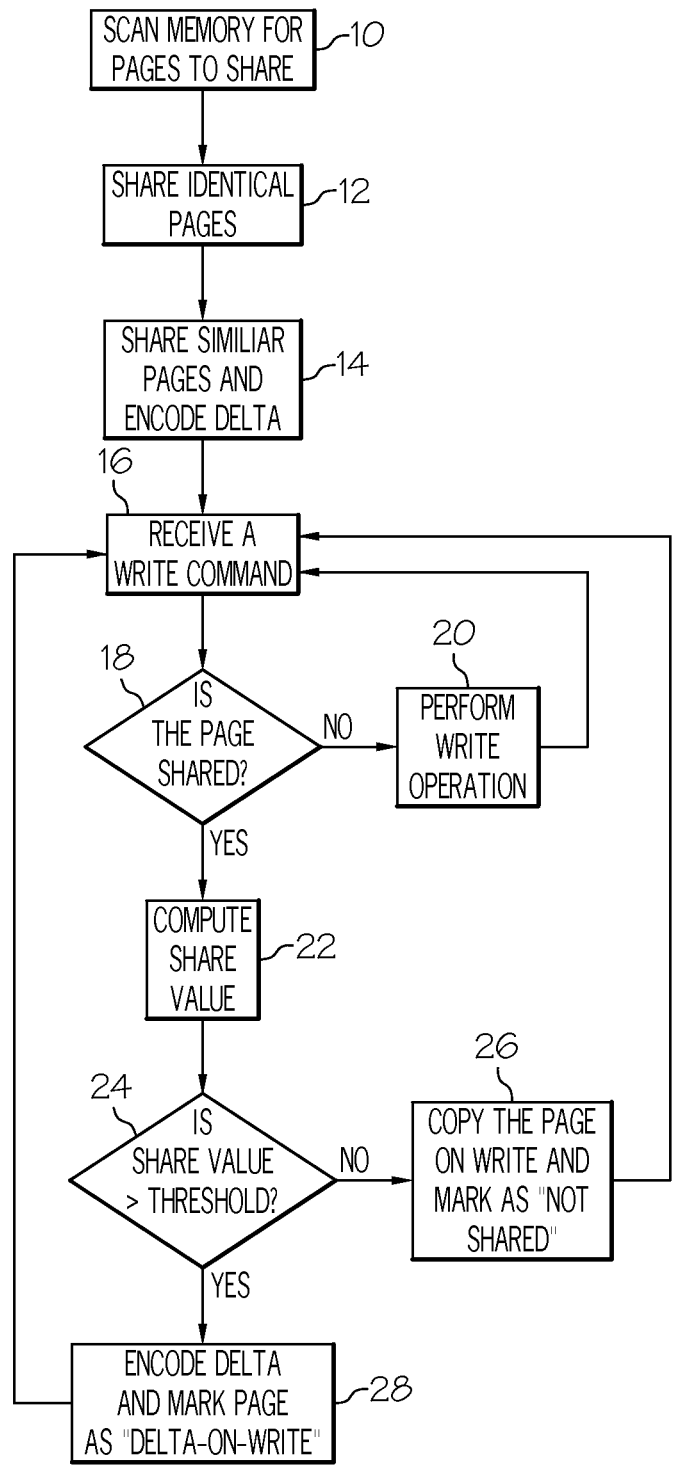
FIG. 1 is a flowchart of a method of sharing data, in accordance with an embodiment of the present invention.
Figure 2A:
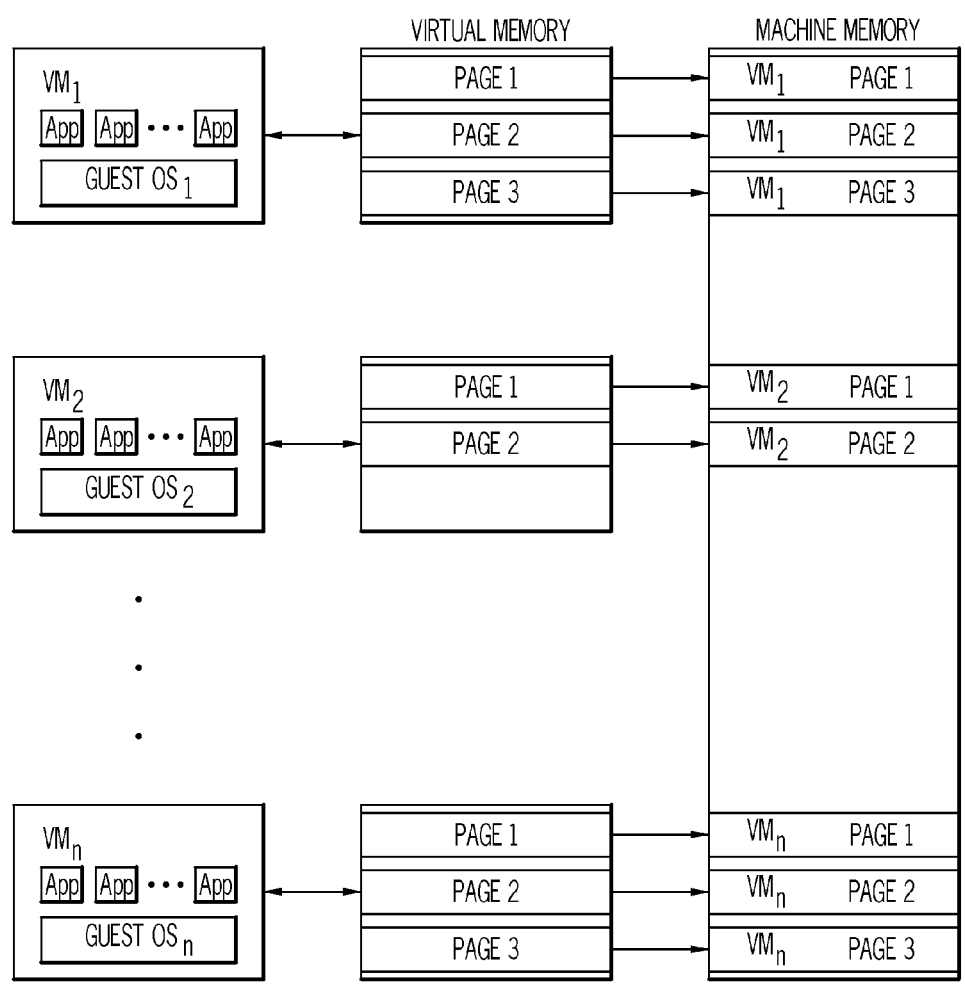
FIGS. 2A-2D illustrate examples of memory maps, in accordance with embodiments of the present invention.

Referring now to FIGS. 1 and 2A-D, a flowchart of a method of sharing data and examples of memory maps are respectively illustrated in accordance with an embodiment of the present invention. The memory (e.g., machine memory in FIGS. 2A-D) is scanned to identify pages to share (block 10). The pages to be shared may be identified by identifying pages that are identical or pages that are merely similar. While such scanning is illustrated as being performed only once in FIG. 1, such scanning may occur multiple times such as on a periodic or as-needed basis. Additionally, the identification of identical or similar pages to share may happen on an on-going or on-the-fly basis. FIG. 2A illustrates an example memory map before any page sharing occurs. FIG. 2A illustrates virtual machines $VM_1$ through VMn. Each virtual machine executes a guest operating system ("Guest OS") and may run one or more applications ("apps"). Each virtual machine utilizes virtual memory, which is mapped to machine memory. $VM_1$ references Page 1, Page 2 and Page 3 in virtual memory. Those pages in turn are mapped to corresponding pages in the machine memory. $VM_2$ and VMn are shown with similar mapped pages. For purposes of this example, it is assumed that $VM_1$, Page 2 is identical to VMn, Page 1. It is further assumed that $VM_2$, Page 1 is similar enough to $VM_1$, Page 1 to share.

The identification of identical and similar pages may be done using any suitable technique. For example, a hash value may be determined for every page (for the entire page) and pages with identical hash values identified. This technique is computationally intensive. As another example that is less accurate but also less computationally intensive, two hash functions could be identified for each page. Pages for which those two hash functions match could be assumed to be identical.

Regardless of the technique used to identify pages to share, identical pages are shared (block 12). Sharing identical pages involves deleting duplicate copies of pages, updating the memory map such that all references point to the remaining shared page, and marking the remaining page as "shared." Similar pages are also shared (block 14) by creating ("encoding") and storing a delta that describes the difference from one page to the other similar page. The page for which the delta is encoded is deleted and the memory map is updated for that page to point to the delta. The delta in turn points to the remaining shared page. The remaining shared page is marked as "shared."

Figure 2B:
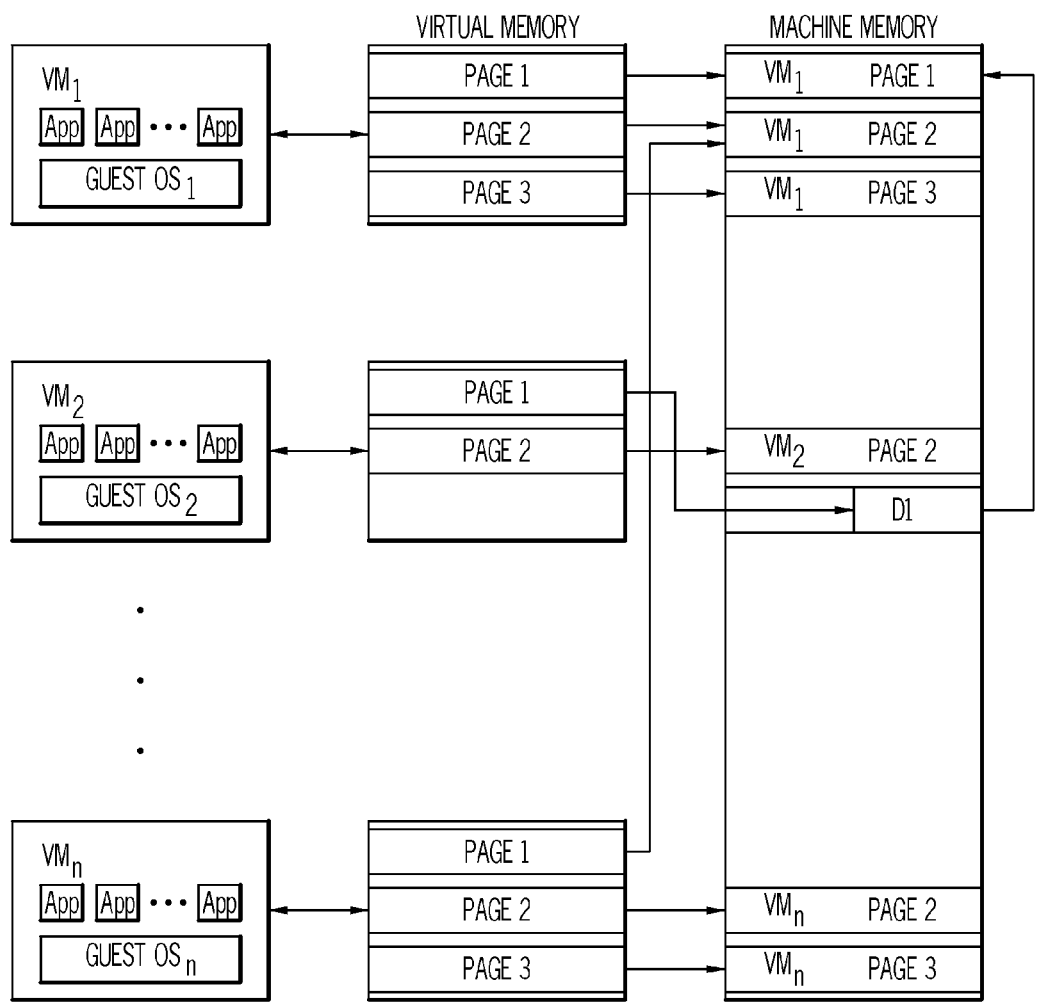

As mentioned above, for purposes of this example it is assumed that $VM_1$, Page 2 is identical to VMn, Page 1 and that $VM_2$, Page 1 is similar enough to $VM_1$, Page 1 to share. FIG. 2B illustrates the memory map after these pages are shared. As illustrated in FIG. 2B, VMn, Page 1 has been deleted because it was identical to $VM_1$, Page 2 and the memory map has been updated so that Page 1 in VMn's virtual memory points to $VM_1$, Page 2 in machine memory. Although not illustrated, $VM_1$, Page 2 would be marked as "shared."

Similarly, $VM_2$, Page 1 has been deleted because it was similar to $VM_1$, Page 1 and a delta ("D1") has been encoded to describe the difference between $VM_2$, Page 1 and $VM_1$, Page 1. The memory map has been updated so that Page 1 in $VM_2$'s virtual memory points to D1 in machine memory, which in turn points to $VM_1$, Page 1. Although not illustrated, $VM_1$, Page 1 would be marked as "shared."

When a write command is received (block 16) that would modify a page, it is determined if the page is shared (block 18). If the page is not shared, the write command is performed (block 20). If the page is shared, a share value is computed (block 22). The share value provides a way of determining how different the resulting page would be (from the original shared page) if the write command were performed. While the share value is computed based on what the page would look like if the write command were performed, the share value is computed before the write command is performed (and may result in the write command not being performed, as discussed below).

The share value is computed by computing a first Bloom filter for the shared data and computing a second Bloom filter for the shared data if the write command were implemented. A Bloom filter is a space efficient probabilistic data structure that is used to test if an element is a member of a set. Embodiments of the invention use Bloom filters to concisely represent information contained in a page. A logical AND operation is applied to the first and second Bloom filters, and the resulting bits are summed. The resulting sum is the share value. As an example of computing a share value, consider Page X ("PgX") having content represented by the following twenty-four bits of data:

1000 0001 1100 0110 0000 0001.

Although not shown, these twenty-four bits are typically referenced (from left to right) 23 through 0. These twenty-four bits are "chunked" into six chunks as shown for purposes of computing a Bloom filter. (An actual page of data would typically have many more than twenty-four bits, and the number of chunks into which each page is split may vary. A typical 4K page would have 4×1024 or 4096 bits, and might be "chunked" into sixteen chunks that are each 256 bits.) Page Y ("PgY") was previously determined to be identical to Page X, and therefore Page Y was deleted and the memory map updated such that Page Y points to Page X. Assume now that a write command has been received to change the four bit group that is second from the left (bits 19-16) from "0001" to "0100."

A Bloom filter for Page X ("BPx") is computed as:
0001000101000011.

Similarly, a Bloom filter is computed for Page Y as if Page Y were changed as indicated in the write command. The Bloom filter for Page Y ("BPy") is computed as:
0001000100010011.

A logical AND operation of BPx and BPy is performed, resulting in:
0001000100000011.

The resulting bits are summed, resulting in a share value of four. The share value provides a numerical indication of how similar Page Y would still be to Page X if the write command were implemented.

The computed share value is compared to a predefined threshold to determine if the share value is greater than the threshold (block 24). The threshold is typically based on the maximum share value. The maximum share value corresponds to the number of chunks into which the pages are broken in order to compute Bloom filters. In this example, the twenty-four bit page is broken into six chunks, therefore the maximum share value is six. As mentioned above, an actual page of data might be 4K in size and might be "chunked" into sixteen chunks that are each 256 bits, thereby having a maximum share value of sixteen. In one embodiment of the invention, the threshold is based on a percentage of the maximum share value (e.g., 50%).

Setting the threshold to 50% of the maximum share value means that the result of the comparison in block 24 will be 'NO' when the write command would cause the page to have less than 50% of its content still in common with the original shared page. The theory is that it may no longer make sense to share the pages when the differences become too great. To continue the above example, the computed share value of four is compared to a threshold that is 50% of the maximum share value—that is, the threshold is three. When the share value is no longer greater than the threshold (as determined at block 24), a copy-on-write operation is performed (i.e., the original shared page is copied and the write command is performed on the copy) and both the original and copy are marked as "not shared" (block 26).

If the computed share value is determined at block 24 to be greater than the threshold (which it is in this example, since the computed share value is four and the threshold is three), a delta is encoded to describe the difference between Page Y if the write command were implemented and Page X (block 28). The delta contains a pointer to Page X. The original shared page (Page X) may be marked as "delta-on-write" to indicate that there is a delta pointing to the original share page. Any suitable delta encoding method may be used. In the example above in which a write command has been received to change the four bit group that is second from the left (bits 19-16) from "0001" to "0100," the encoded delta may have the following format:

Copy 5, 23
Add 3, 100
Copy 16, 15.

This delta indicates that Page Y can be reconstructed from Page X by (a) copying five bits from Page X starting at location 23 (i.e., bits 23-19), (b) changing the next three bits (i.e., bits 18-16) to "100," and (c) copying sixteen bits from Page X starting at location 15 (i.e., bits 15-0).

Figure 2C:
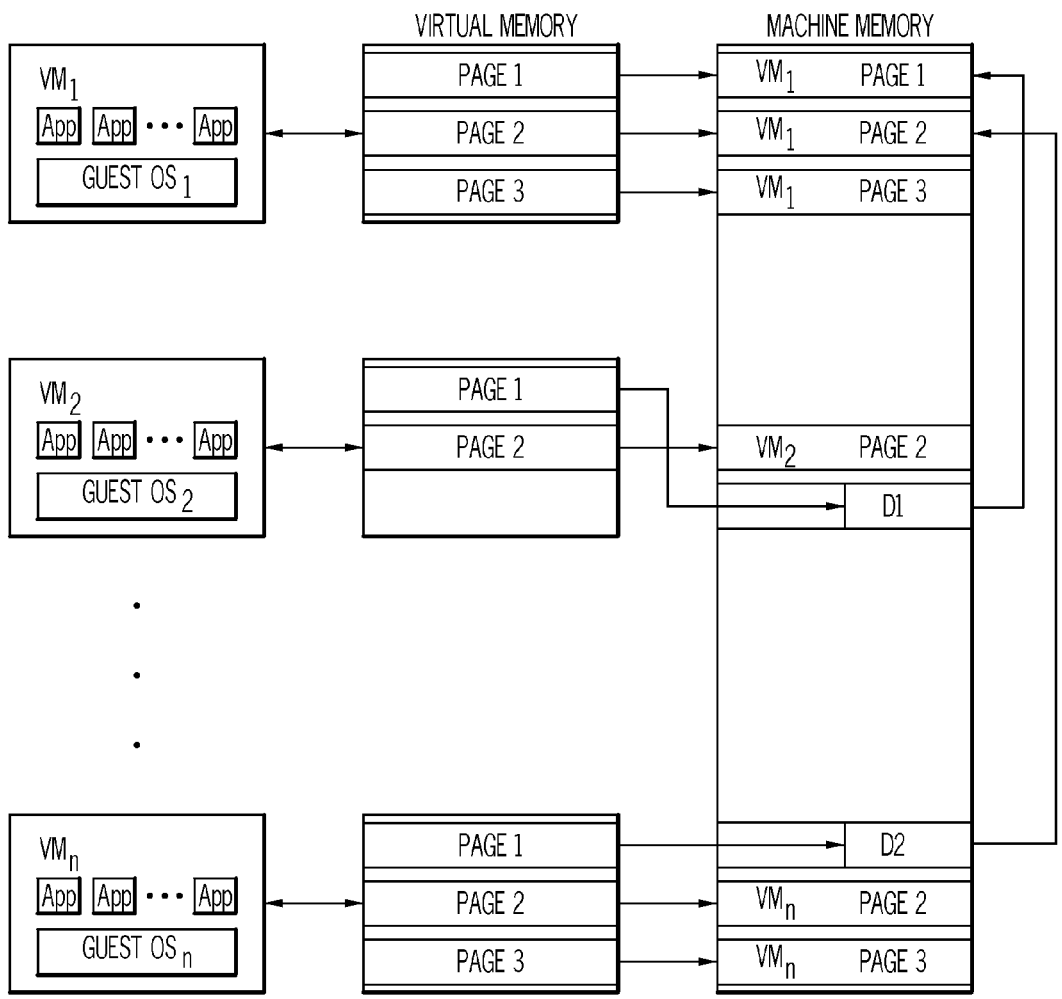

In FIG. 2C we see the change to the memory map that would occur if Page 1 of VMn were written to. Assuming the share value would still be above the threshold if the write command were implemented, a delta ("D2") is encoded to describe the difference between VMn, Page 1 if the write command were implemented and $VM_1$, Page 2. The memory map has been updated so that Page 2 in VMn's virtual memory points to D2 in machine memory, and delta D2 in turn points to $VM_1$, Page 2. Although not illustrated, $VM_1$, Page 2 would be marked as "delta-on-write." Blocks 16-28 would be repeated for each write command received.

Figure 2D:
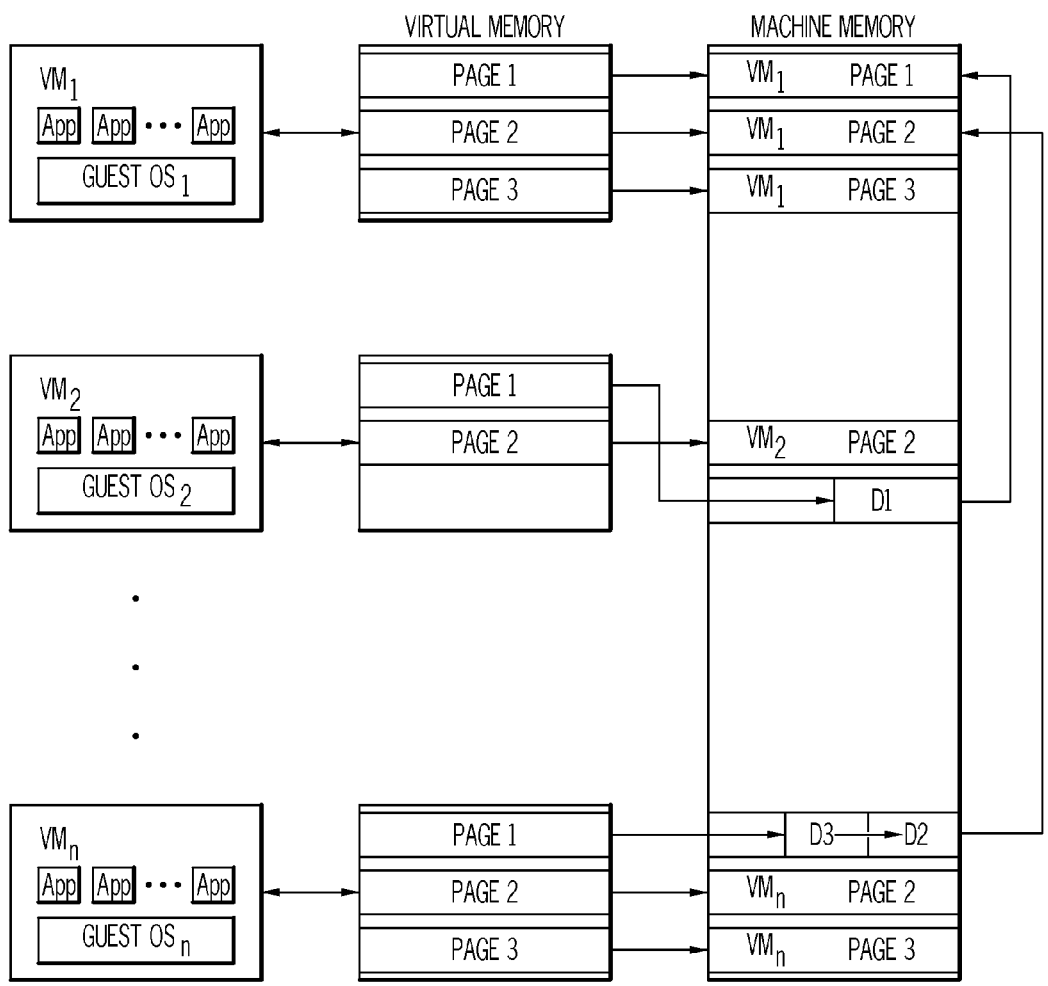

Multiple writes to the same page would result in serially encoded deltas, as long as the share value remains greater than the threshold. In FIG. 2D we see the change to the memory map that would occur if Page 1 of VMn were again written to. Assuming the share value would still be above the threshold if the write command were implemented, a delta ("D3") is encoded to describe the difference between (a) VMn, Page 1 if the write command were implemented and (b) $VM_1$, Page 2 if the change described in the delta D2 were implemented (note that this would require reconstruction of the page (i.e., implementing the change described in D2) to be able to determine the difference to be described in D3). The memory map has been updated so that Page 2 in VMn's virtual memory points to D3, which in turn points to D2, which in turn points to $VM_1$, Page 2.

Any of the pages for which a delta (or multiple deltas) has been encoded can be readily reconstructed as needed by decoding the delta (or deltas) to identify the changes encoded in the delta and applying those changes to the original shared page. If multiple deltas are encoded, it is important to decode the deltas in the correct order (oldest to newest) in order to properly reconstruct the pages.

Figure 3:
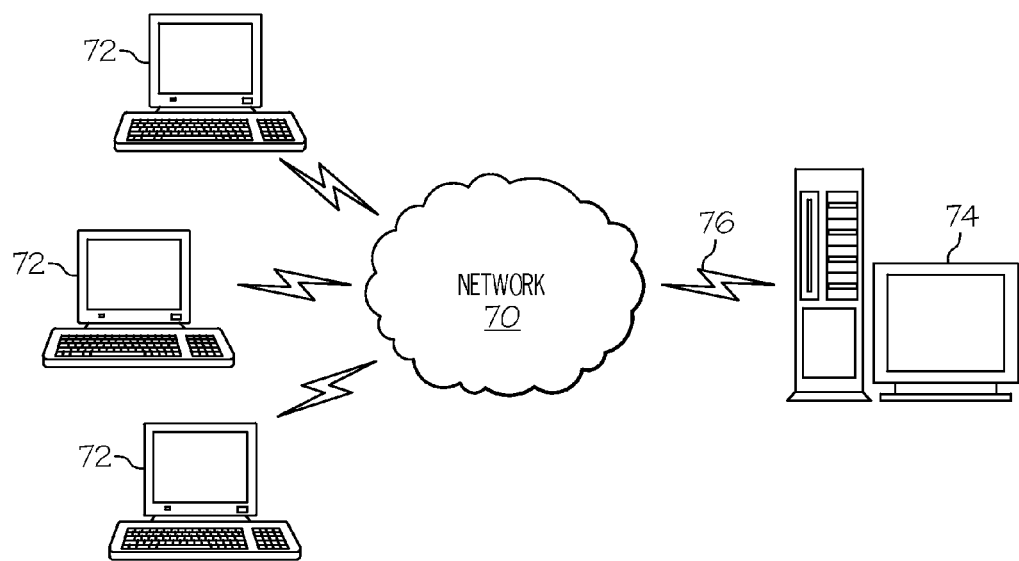
FIG. 3 is a schematic block diagram of a computer network in which embodiments of the present invention may operate.

FIG. 3 is a schematic block diagram of a computer network in which embodiments of the present invention may operate. Computers 72 and server 74 provide processing, storage, and input/output devices executing application programs and the like. Computers 72 may be linked over communication link 76 through communications network 70 to each other and to other computing devices, including servers 74. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. However, computers 72 and servers 74 may be linked over any suitable communication network.

In addition to the client-server arrangement of FIG. 3, embodiments of the invention may operate in any client-server arrangement or in any networked arrangement in which resources that originate communications and resources that receive communications may reside on separate elements in a network. For example, embodiments of the invention may operate in a mobile communications/data architecture (such as a mobile telecommunications network adhering to the International Mobile Telecommunications-2000 (also termed 3G) or IMT-Advanced (also termed 4G) standards), in which a mobile telecommunications device (e.g., cell/mobile telephone) communicates.

Figure 4:
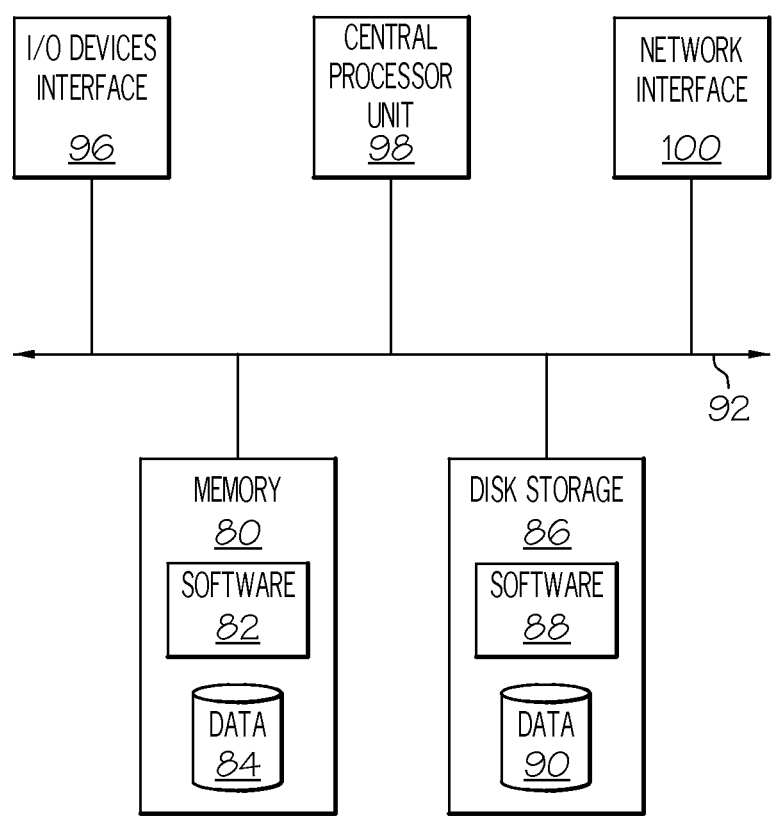
FIG. 4 is a schematic block diagram of a computer in the network of FIG. 3.

FIG. 4 is a diagram of one possible internal structure of a computer (e.g., computer 72) or server in the system of FIG. 3. Each computer typically contains system bus 92, where a bus is a set of hardware lines used for data transfer among the components of a computer. Bus 92 is essentially a shared conduit that connects different elements of a computer system (e.g., processor, disk storage, memory, input/output ports, network ports, etc.) that enables the transfer of information between the elements. Attached to system bus 92 is I/O device interface 96 for connecting various input and output devices (e.g., displays, printers, speakers, microphones, etc.) to the computer. Alternatively, the I/O devices may be connected via one or more I/O processors attached to system bus 92. Network interface 100 allows the computer to connect to various other devices attached to a network (e.g., network 70 of FIG. 3). Memory 80 provides volatile storage for computer software instructions 82 and data 84 used to implement an embodiment of the present invention. Disk storage 86 provides non-volatile storage for computer software instructions 88 and data 90 used to implement an embodiment of the present invention. Central processor unit 98 is also attached to system bus 92 and provides for the execution of computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. If the service is also available to applications as a REST interface, then launching applications could use a scripting language like JavaScript to access the REST interface. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A computer-implemented method for sharing data, comprising:
   receiving, by a computer, a write command to modify shared data;
   determining, by the computer, an amount of shared content between (i) the shared data and (ii) the shared data if the write command were to be implemented;
   comparing, by the computer, the determined amount of shared content to a predefined threshold;
   if the determined amount of shared content is above the predefined threshold, creating and storing, by the computer, a delta that describes a difference between (i) the shared data and (ii) the shared data if the write command were to be implemented, wherein the write command is not implemented such that the shared data is not modified; and
   if the determined amount of shared content is not above the predefined threshold, creating a copy of the shared data, modifying the copy of the shared data as indicated by the write command, and storing the modified copy of the shared data by the computer.

2. The method of claim 1, further comprising:
   if the determined amount of shared content is above the predefined threshold, modifying, by the computer, a page pointer which points to the shared data to instead point to the delta;
   wherein the delta comprises a pointer to the shared data.

3. The method of claim 1, wherein determining the amount of shared content comprises calculating a share value and calculating the share value comprises:
   computing, by the computer, a first Bloom filter for the shared data;
   computing, by the computer, a second Bloom filter for the shared data if the write command were to be implemented;
   applying, by the computer, a logical AND operation to the first and second Bloom filters; and
   summing, by the computer, the bits of the result of the logical AND operation.

4. The method of claim 3, where the first and second Bloom filters are computed based on dividing, respectively, the shared data and the shared data if the write command were to be implemented into a predefined number of chunks of data.

5. The method of claim 4, wherein the predefined threshold comprises a predefined percentage of the predefined number of chunks of data.

6. The method of claim 1, wherein the write command is a first write command and the delta is a first delta; and wherein the method further comprises:
   receiving, by the computer, a second write command to modify the shared data if the first write command were to be implemented;
   determining, by the computer, an amount of shared content between (i) the shared data and (ii) the shared data if the first and second write commands were to be implemented;
   comparing, by the computer, the determined amount of shared content to the predefined threshold;
   if the determined amount of shared content is above the predefined threshold, creating and storing, by the computer, a second delta that describes a difference between (i) the shared data if the first write command were to be implemented and (ii) the shared data if both the first and second write commands were to be implemented, wherein the second write command is not implemented such that the shared data is not modified; and
   if the determined amount of shared content is not above the predefined threshold, (i) creating a copy of the shared data, (ii) decoding the first delta, (iii) modifying the copy of the shared data as indicated by the first delta, (iv) further modifying the copy of the shared delta as indicated by the second write command, (v) deleting the first delta, and (vi) storing the twice modified copy of the shared data by the computer.

* * * * *